US009026477B2

(12) United States Patent
Bonnet et al.

(10) Patent No.: US 9,026,477 B2
(45) Date of Patent: May 5, 2015

(54) METHOD FOR IDENTIFYING A PERSON'S POSTURE

(75) Inventors: Stephane Bonnet, Seyssinet (FR); Christelle Godin, Brignoud (FR)

(73) Assignee: Commissariat a l'Energie Atomique, Paris (FR)

( * ) Notice: Subject to any disclaimer, the term of this patent is extended or adjusted under 35 U.S.C. 154(b) by 719 days.

(21) Appl. No.: 12/162,186

(22) PCT Filed: Feb. 2, 2007

(86) PCT No.: PCT/EP2007/051042
§ 371 (c)(1),
(2), (4) Date: Jul. 25, 2008

(87) PCT Pub. No.: WO2007/088205
PCT Pub. Date: Aug. 9, 2007

(65) Prior Publication Data
US 2009/0012921 A1    Jan. 8, 2009

(30) Foreign Application Priority Data
Feb. 2, 2006    (FR) ...................................... 06 50376

(51) Int. Cl.
*G06F 15/18*    (2006.01)
*G06K 9/68*    (2006.01)
*G06K 9/00*    (2006.01)

(52) U.S. Cl.
CPC .......... *G06K 9/6807* (2013.01); *G06K 9/00342* (2013.01)

(58) Field of Classification Search
USPC .......................................................... 706/12
See application file for complete search history.

(56) References Cited

U.S. PATENT DOCUMENTS

| 7,467,061 B2 * | 12/2008 | Satoh et al. .................... 702/150 |
| 2002/0170193 A1 * | 11/2002 | Townsend et al. .............. 33/512 |
| 2005/0256391 A1 * | 11/2005 | Satoh et al. .................... 600/407 |

FOREIGN PATENT DOCUMENTS

| FR | 2 886 532 | 12/2006 |
| WO | WO 2005/094676 A1 | 10/2005 |

OTHER PUBLICATIONS

Mathie et al., Classification of basic daily movements using a triaxial accelerometе. Sep. 2004.*
Kourosh Kiani, Recognition of pattern in multichannel recorded data using artficial neural networks and fuzzy rule based systems:application to daily life motor activities. Nov. 1997.*
Classification of basic dailymovements using a triaxial accelerometer M. J. Mathie 1"2 B.G. Celler 1"2 N.H. Lovell 1"3 A.C.F. Coster 4 1Centre for Health Informatics, University of New South Wales, Sydney, Australia 2School of Electrical Engineering & Telecommunications, University of New South Wales, Sydney, Australia 3Graduate School of Biomed.*

(Continued)

*Primary Examiner* — Kakali Chaki
*Assistant Examiner* — Ababacar Seck
(74) *Attorney, Agent, or Firm* — Oblon, Spivak, McClelland, Maier & Neustadt, L.L.P.

(57) ABSTRACT

A classification method including first classifying an event of any kind by first rules, and then second classifying events, not identified by the first classification, by a learning base reinforced with all the events identified by the first classification. The method is adaptive if the second classification rules are amended according to new examples that were able to be determined by the first rules.

10 Claims, 3 Drawing Sheets

(56) References Cited

OTHER PUBLICATIONS

Recognition of patterns in multichannel recorded data using artificial neural networks and fuzzy rule based systems; application to daily life motor activities © Kourosh Kiani 1997.*

Automatic Segmentation of Moving Objects in Video Sequences: A Region Labeling Approach Yaakov Tsaig and Amir Averbuch.*

S. Bonnet, et al., "22.5 Robust posture classification with a single attitude sensor", Gait & Posture, vol. 21, Jun. 2005, p. S144.

Rangaraj M. Rangayyan., "Biomedical Signal Analysis: A Case-Study Approach", Wiley-IEEE Press, XP-002429221, pp. 405-414.

Tong Zhang, et al., "Wavelet based approach for detecting and classifying epileptiform waves in EEG", XP-002429225, 1999, 1 Page.

Haejeong Park, et al., "Hybrid neural-network and rule based expert system for automatic sleep stage scoring", XP-002429224, 002429224, 2000.

M.E. Cohen, et al., "Combination of a Neural Network Model and a Rule-Based Expert System to Determine Efficacy of Medical Testing Procedures", Images of the Twenty First Century, Proceeding of the Annual International Conference of the Engineering in Medicine and Biology Society, Nov. 9, 1989, 3 Pages.

David H. Kil., "Pattern Recognition and Prediction with Application to Signal Characterization", AIP Press, XP-002412241, pp. 111-116.

L. Kuncheva., "Combining Pattern Classifiers: Methods and Algorithms", John Wiley & Sons, XP-002412236, 2004, pp. 68-71.

R. O. Duda, et al., "Pattern Classification, passage", Wiley & Sons, XP-002374469, 2001, pp. 394-413.

S. Theodoridis, et al.,"Pattern Recognition", Academic Press, XP-002412237, 1999, pp. 126-128.

Tzay Y. Young. King Sun Fu., "Handbook of Pattern Recognition and Image Processing" Academic Press Inc, XP-002412242, 1986, pp. 26-27.

Brian D. Ripley., "Pattern Recognition and Neural Networks", Cambridge University Press, XP-002412243, 2005, pp. 213-216.

Classification of basic dailymovements using a triaxial accelerometer M. J. Mathie 1"2 B.G. Celler 1"2 N. H. Lovell 1"3 A.C.F. Coster 4 1Centre for Health Informatics, University of New South Wales, Sydney, Australia 2School of Electrical Engineering & Telecommunications, University of New South Wales, Sydney, Australia 3Graduate School of Biomed.

* cited by examiner

METHOD FOR IDENTIFYING A PERSON'S POSTURE

BACKGROUND OF THE INVENTION

1. Field of the Invention

The subject of this invention is the remote identification of postures assumed by a person by utilizing the signals continuously provided by a sensor which he/she wears. It involves the classification of the states successively assumed by the sensor and the person. A notable difficulty is to utilize abundant but not very descriptive signals since the postures are complex, subject to variations and to transient states and that they do not lend themselves to direct measurements.

2. Description of the Related Art

In the art of classification, for each event to be classified a certain number of characteristics are defined, called parameters which are used for the classification and which may stem from sensors or from other pieces of information. The events should be distributed into categories called classes according to the values assumed by these parameters. Certain classification methods are accomplished automatically, by a computer having logic or digital comparison and decision tools.

Two main methods exist. In the first, classification resorts to explicit rules which cause the membership of a class to depend on the value of a particular parameter or a group of parameters. For example, an event is assigned to a class if a parameter reaches a value above a threshold, or if the sum of one group of parameters is above a threshold, the value of which is defined by one skilled in the art. With such methods it is possible to identify certain postures as this will be seen, but their effectiveness is not sufficient and many portions of the signals from the sensor cannot be identified.

The other group of known methods uses what is called a learning base comprising a certain number of events. The computer must then define the classification rules, which remain implicit to the operator according to the values of the parameters. In a first so-called non-supervised learning alternative, the computer itself distributes the events of the base into classes according to similarities or distances between the events, and the definition of the classes remains unknown. In another so-called supervised learning alternative, the operator indicates the class of each event of the learning base, and the task of the computer is to define a digital or logic function which observes the classification decided by the operator according to the parameters of the events. It is also possible to combine both alternatives in order to obtain therefrom a third so-called semi-supervised learning alternative wherein membership of a class is defined by the operator only for some of the events of the learning base (in practice, in small number as compared with the others).

The common drawback to all these methods is the difficulty of establishing good rules, capable of minimizing the proportion of poorly classified events. With explicit rules defined by the operator, many events remain indeterminate in practice because it is difficult to establish specific and detailed rules by observation or intuition; in the learning methods, the automatically defined rules will be inaccurate if the examples added into the learning base are poorly representative of future events, and sometimes the operator's lack of control over these implicit rules will not allow him/her to correct them. Further, building up a learning base by hand requires time and may involve errors. Finally, such a table will not be upgradeable.

BRIEF SUMMARY OF THE INVENTION

The progress provided by the invention, in its most general form, is to improve the classification results in the mentioned application.

In its most general form, the invention relates to a method for identifying postures of a person, comprising the following steps:

attaching a sensor onto the person;

recording at least one signal from the sensor during a time window;

extracting partitioning parameters from said signal;

dividing from partitioning parameters, the time window into segments meeting a posture homogeneity or posture change criterion, and extracting for each of the segments, a first set of parameters from said signal;

classifying each of the segments into one of the event classes associated with said events, or into a class which is not associated with an event, by applying the first decision rules starting with the first set of parameters associated with the segments;

comprising a calibration operation intended to generate a learning base, comprising the following steps for each segment belonging to an event class:

extracting a second set of parameters from said signal;

adding into said learning base a datum listing the second set of parameters and the event class associated with the relevant segment, and using the learning base for classifying segments of said record or of another subsequent record which has not been associated with an event by applying second decision rules using the learning base starting with a second set of parameters associated with these segments.

Certain methods make use of several sensors, placed at as many different locations of the body, in order to detect postures without any ambiguity; but permanently wearing all these sensors is unpleasant.

Other methods make use of a single sensor and typically search for transient states, clues for a change in posture, on the signals; but ambiguities subsist between a sitting position and a standing position for example.

No method exists in the contemplated application, according to which two fundamentally different classification steps are used, since they resort to generally different parameters for classifying segments of characteristic signals from different postures. The rational separation of the signal into homogenous segments, able to be achieved automatically, is itself not solved. The result of this is that with the prior methods, a much larger number of segments remain indeterminate. The advantage of the invention stems from that some portions of the signals may be analyzed in a simple way in order to extract certain characteristics therefrom, which directly contribute to their identification (the first group of parameters), and are then utilized for extracting other characteristics therefrom (the second group of parameters) in order to assist in identifying other portions of the signals. The second decision rules, resorting to acquired experience, and all the more so that they may be made upgradeable by receiving new results, therefore find a particular advantage here.

Among certain particularly important embodiments, mention will be made of the distribution of the segments into two categories, some being the result of stable postures and others of transient states between two stable postures; and of a rational division of the signal into segments, as this has been mentioned.

BRIEF DESCRIPTION OF THE DRAWINGS

The invention will now be described in more detail by means of the figures.

DETAILED DESCRIPTION OF THE INVENTION

Figure 1:
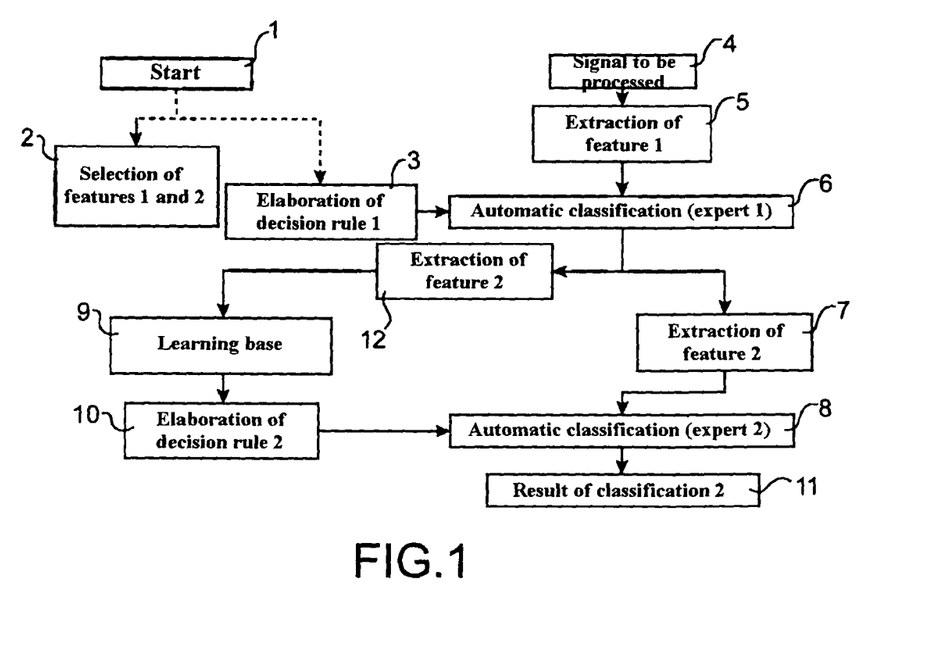
FIG. 1 is a general view of the method.

We address FIG. 1. The invention applies an operator in the first steps of the method, and then a computer. In an initial step 1, the operator distinguishes two subsets of parameters of the events in step 2, and elaborates first decision rules in step 3 by means of the subset of the first parameters. He/she finally creates a learning base which may either be empty, or partly filled. The computer then receives the information from a new event as a signal to be processed in step 4; this signal comprises the parameters of the event, which were obtained by measurements or other means. The computer extracts the values of first parameters of this signal in step 5. It then attempts to classify the event among the different classes by means of the first decision rules defined in step 3, but without necessarily achieving this in the presence of a doubtful event (step 6). In this case, the computer extracts from the signal the values of the second parameters in step 7 and resumes the classification attempt in the next step 8 by applying second decision rules in step 10. A classification state is finally given in step 11.

If however the first classification step of step 6 was fruitful, the method is conducted otherwise and extraction of the second parameters, carried out in step 12, is then used for filling the learning base by adding these parameters thereto and the result of the first classification, completing or amending the second decision rules used in step 10 according to the classification result of the present event and the values of its second parameters. It is thus presumed that future events will be classified with more and more reliability.

The concrete means for elaborating second decision rules comprise various known kinds. As an illustration, the use of a neuron network in FIG. 2 will be described here. The network comprises a layer of input neurons P1, P2, . . . , Pn, for receiving the values of the second parameters of the events in digital form.

Figure 2:
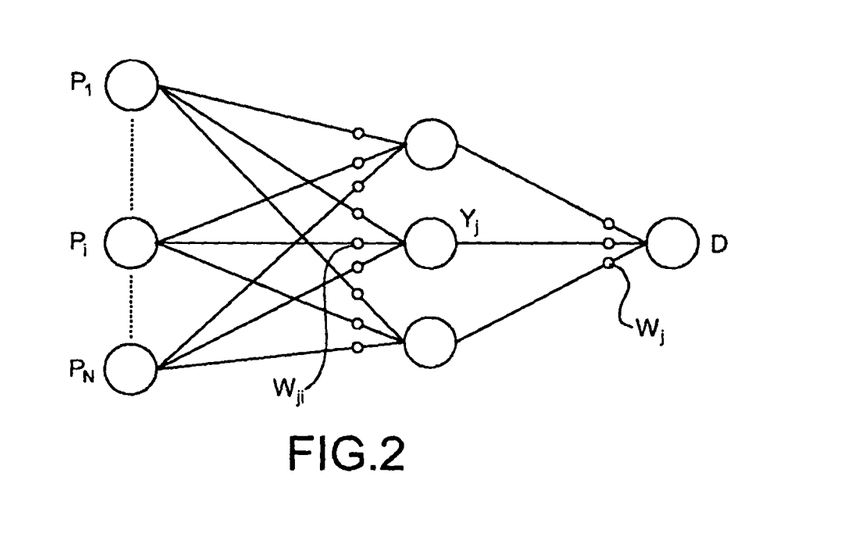
FIG. 2 is a view of a network of neurons.

The classification decision in a determined class is given also in digital form by the contents of an output neuron D. The neuron network comprises at least one hidden layer of neurons $y_j$ which perform digital combinations of the parameters and transmit them to the next layer of the network, here immediately to the output neuron D. Digital weights w are applied to the transmitted values before they reach the neurons of the hidden layer or the output neuron. Here, the neurons of the hidden layer carry out hyperbolic tangent activation and the output neuron carries out linear activation. The decision function may then be written according to formula (1)

$$D_W(\vec{P}) = \text{sgn}\left(\sum_j w_j \tanh\left(\sum_i w_{ji} p_i + w_{oj}\right) + w_o\right) \quad (1)$$

wherein sgn is the sign function, tan h the hyperbolic tangent function, $w_j$ the weight connecting the output of the neuron $y_j$ to the output neuron D, $w_o$ and $w_{oj}$ particular weights called biases or thresholds connecting a fictive output neuron of value equal to 1 to the output neuron (for $w_o$) or to the neurons $y_j$ of the hidden layer (for $w_{oj}$) and $w_{ji}$ being the weights connecting the input neurons $P_i$ to the neurons of the hidden layer $y_j$.

With neuronal networks, it is possible, provided that the number of neurons was properly selected in the hidden layer(s), to approach any function once the proper weights have been found. Elaboration of the second decision rules therefore amounts to adjusting the weights w so as to cause, for almost each example of the learning base 9, the result of the decision by the neuron network to coincide with the known result of the classification. When step 12 is applied, the computer adjusts the weights so that the largest number of events of the learning base—enriched with the new event—is properly evaluated by the second decision rules.

Other kinds of digital classifiers are known in the art: linear separators, decision trees, SVM (Support Vector Machine or vast margin separator) The invention also applies to them.

Figure 3:
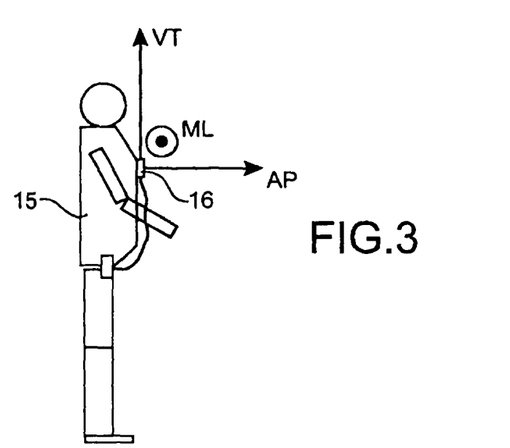
FIG. 3 is a schematic view of an application of the method.

According to the invention, the concern is to identify the posture of a person at any moment by remote monitoring, notably for medical purposes. The person is equipped with a motion sensor of a known kind and which may comprise a triaxial accelerometer and a triaxial magnetometer for detecting the orientation and the movement of the person wearing it, according to the directions of the Earth's magnetic field and gravity. With reference to FIG. 3, where the sensor-wearing person has reference 15 and the sensor reference 16, it is seen that the sensor 16 is attached onto the chest of the person 15 and that the main measurement axes are the antero-posterior axis AP directed towards the front, the medio-lateral axis ML directed to the right and the vertical axis VT directed upwards; if need be, a preliminary calibration procedure is carried out on the person 15 in order to align the measurement axes of the sensor and the anatomical axes of the person 15, by determining a passage matrix which connects them. This matrix is supposed to be invariable, which is true as long as the sensor 16 is not displaced on the person 15. Further, with algorithms for merging information, it is possible to obtain the orientation of the sensor 16 in space from its measurements by expressing them by Euler angle rotations or quaternions. One will notably resort, in the example detailed further on, to the tilt angle of the person in the sagittal plane (vertical and antero-posterior plane) by means of the measurements of the accelerometer and to the yaw angle for determining azimuth (angle of the antero-posterior axis with a fixed reference, here magnetic North) with the magnetometer.

Figure 4:
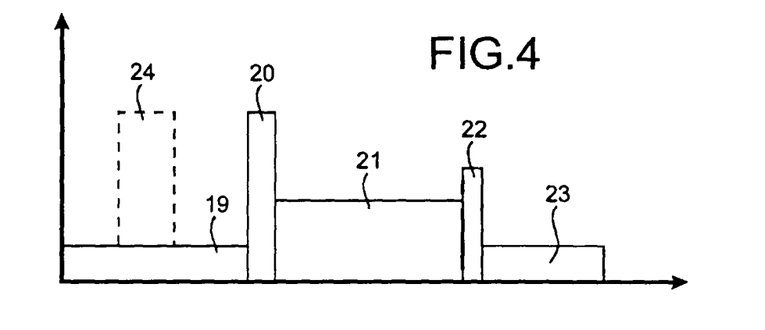
FIG. 4 is a diagram giving details on an exemplary signal sample of this application.

The invention is applied for distinguishing between certain kinds of activity of the person 15 and certain of his/her postures. In the diagram of FIG. 4, expressed as activity energy versus time, a standing state, a standing/sitting transition, a sitting state, a sitting/standing transition and a standing state are found in states 19-23 successively. The transition states always correspond to intense activities and to energy peaks, and stable position states are often longer and less active, but exceptions exist, such as running, during which the wearer in a stable standing position will have great energy. Further, the energy may strongly vary during a same state. A running period 24 during the first standing state 19 is thereby illustrated. It is therefore not possible to directly deduce the succession of the states of a diagram such as the one of FIG. 4, which may however be used for a rational division into segments of unequal durations but with homogenous characteristics.

Figure 6:
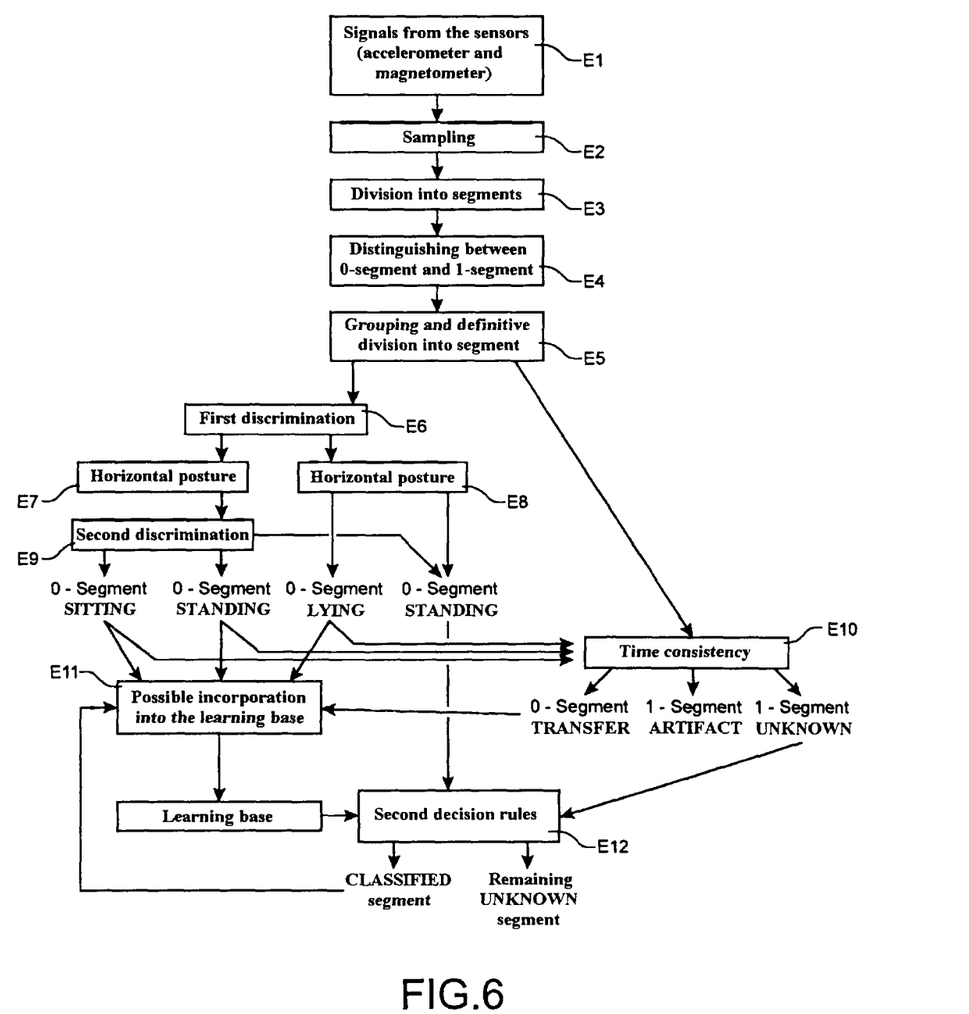
FIG. 6 is a detailed view of a particular method.

In the complete classification method example which is provided hereafter with the support of FIG. 6, the classes are nine, ten or eleven in number: three stable states (sitting, standing and lying), and six states for transferring from one state to another of the previous stable states (standing to sitting, sitting to standing, standing to lying, lying to standing, sitting to lying and lying to sitting); a new <<unknown>> class may be added, into which events are added which were unable to be added into one of the previous classes, or an "ARTEFACT" class which designates movements limited by two similar postures and which do not correspond to a defined event.

Various steps are undertaken. In a first phase (steps E1-E5), the recording is cut up into portions or time segments according to a set of several criteria. One thereby accesses an alternation of homogenous areas in the sense of postures (called "0-segments") and active areas ("1-segments") which potentially represent postural transfers. Each time segment designates an event of which one seeks to determine the class. At the end of this first phase, all the time segments have the UNKNOWN class.

Secondly (steps E6-E10), a first classification is made according to the first explicitly notified rules by trying to assign a posture class, and this in the surest way as possible, to certain events (associated with respective time segments).

Because of the positioning of the motion sensor relatively to the chest, the horizontal and vertical postures occupied by the person may be more easily distinguished. Above all, one therefore tries to distinguish the horizontal postures (LYING) from the vertical postures (SITTING or STANDING) according to a set of several criteria. A delicate point remains the case of strongly forward tilted postures.

Finally, on the basis of other criteria, the membership of certain signal segments with low variation of activity (0-segments, with which a stable posture may be associated) with a sufficient time length to the SITTING or STANDING class is determined, and de facto on the basis of time consistency the membership of certain segments of the signal with strong variation of activity (1-segments, with which may be associated a transfer from one stable posture to another or a movement in a same posture), to inter-posture and to intra-posture transitions (transfers).

At the end of this second phase, certain time segments have a well identified class and others further have the UNKNOWN class. The first are added into a learning base by the system and are used for defining second decision rules by means of their classification results or of some of their characteristics.

Thirdly (step E12), the learning base is applied in order to attempt to classify at best the events always remaining in the unknown class.

How the first part of the method is conducted will be described below.

After having obtained the signals from the sensor 16 (step E1 of FIG. 6), the analysis is first made on short sampling data of the order of one second (E2); one tries to determine homogenous posture areas without trying to determine this posture.

The criteria for dividing the signals into segments of unequal lengths (E3) are two in number and based on the activity index IA provided by the signals 3a (of the triaxial accelerometer) and on the tilt variations of the chest of the person 15 in the sagittal plane. The corresponding parameters are calculated in the following way. For the activity criterion, the norm of the signals 3a of the accelerometer is representative of the current kinetic energy and provides an objective piece of information on the physical activity of the wearer. The average value is calculated for each one second duration of the signal from the quantity:

$$N_{acc}HF[n] = \sqrt{aHF_{AP}[n]^2 + aHF_{ML}[n]^2 + aHF_{VT}[n]^2}$$

in order to obtain the activity index $$\overline{IA}[n] = \frac{1}{F_e} \sum_{k=0}^{F_e-1} N_{acc}HF[nF_e + k]$$

wherein n is an index, $F_e$ a sampling frequency, $F_{AP}$, $F_{ML}$ and $F_{VT}$ are the measured values of the components of the signal, F is the signal, a the acceleration and H designates pass-band filtering in order to retain the <<high frequencies>> (here from 0.5 to 10 Hz), representative of human activity, by suppressing the direct component (acceleration of gravity) and noise.

Figure 5:
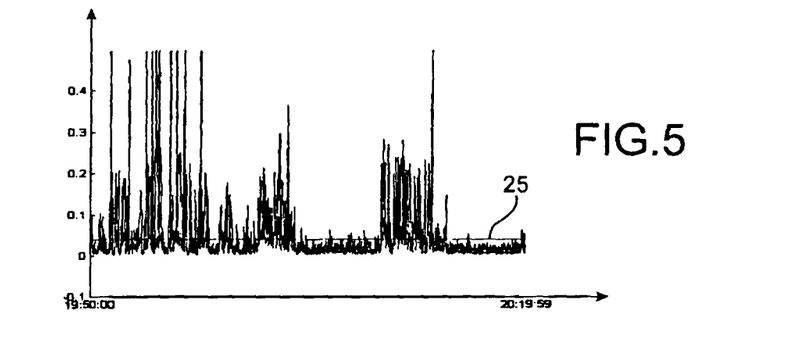
FIG. 5 illustrates another signal sampling operation.

The activity index IA based on the signal 3a is compared with a threshold—materialized by the horizontal line 25 of FIG. 5, of value 0.04—in order to determine whether a time interval is associated with an active phase or a rest phase. The values of the index IA are positive and generally comprised between 0 and 1.

An activity index of the yaw activity of the wearer may also be determined. In order to reduce correlation of the signal 3m (from the triaxial magnetometer) with the signal 3a, the calculation of an index only based on the time variations of the NL (medio-lateral) component of the magnetometer is proposed:

$$IM[n] = \overline{h}_{ML}[n+1] - \overline{h}_{ML}[n]$$

With the average value over 1 second of the ML component of the magnetometer:

$$\overline{h}_{ML}[n] = \frac{1}{F_e} \sum_{k=0}^{F_e-1} h_{ML}[nF_e + k]$$

For the second criterion, the low frequency (below 0.5 Hz) signal 3a of the accelerometer is used for determining the pitch of the person, i.e., his/her tilt in the sagittal plane.

The tilt in the sagittal plane (pitch) is trivially given by:

Pitch[n]=arcsin(aLF$_{AP}$), wherein likewise, a designates the acceleration, L a low-pass filtering of the signal, and F the signal.

A negative pitch corresponds to a person leaning forwards; a positive pitch, to a person leaning backwards.

Variation thresholds of these activity and tilt amounts of the chest are used for detecting the posture transfers. The consecutive sampling portions of signals without any variation reaching these thresholds are grouped together. Segments of unequal durations are thereby obtained from uniform sampling portions, and more specifically with an alternation of time segments of value 0, (0-segments) corresponding to homogenous areas in the sense of the posture (still unknown) and of time segments of short duration of value 1 (1-segments), corresponding to areas with significant motion which may be a postural transfer. The distinction between both of these categories of segments is accomplished (E4). The underlying idea is that a postural transfer corresponds to a certain level of activity and to a certain change in tilt of the chest.

The thresholds used during this step are relatively critical in the sense that the distribution of the obtained data will condition the sensitivity of the classification of postures. In unfavorable cases, a small number of segments may be obtained with a same 0-segment which may contain several different postures or on the contrary a large number of segments and of not very specific 1-segments of a postural transition.

Both criteria were finally applied in the following way; a probable posture transfer corresponds to a minimum variation of 20 degrees for 3 seconds, simultaneous with a minimum variation of 0.08 (standardized units) for 3 seconds. Any sampling portion meeting both of these criteria therefore belongs to a 1-segment, the other ones to a 0-segment.

These thresholds are sufficiently low so as to be sure not to miss a postural transfer. In compensation, many 1-segments are thus identified which are not real postural transfers (artifacts).

In a second pass (E5), certain 1-segments may be invalidated in order to increase specificity and to thereby reduce over-segmentation. After different tests, the choice was made of invalidating a 1-segment if the mean activity level remains high on either side of this 1-segment.

Indeed, the assumption will subsequently be made that a SITTING or LYING posture is characterized by low activity, where IA and IM are less than 0.04 and that strong activity is relative to a STANDING position.

The average of the activity index IA is therefore calculated over each of the 0-segments. If the activity index is larger than the threshold before and after the potential transfer, the 1-segment is then invalidated.

An exemplary application of the decision tree which the first decision rules (E6-E10) form, is given hereafter. In all of the following criteria, the retained values are averages over the relevant segment.

In the time window for analyzing the signals, the first 0-segment capable of representing a horizontal posture (E7) is searched for (E6).

The retained criterion is (|accVT|<th1) or (|accML|>th3), wherein, this time, acc is used for designating the measured acceleration. This allows detection of the cases when the person is strongly leaning in the sagittal plane (a person lying on the stomach/back) or in the side plane (a person lying on the side).

The next 0-segment will then be detected, which is capable of representing a vertical posture (E8). The retained criterion is (accVT>th4). All the 0-segments and 1-segments comprised within the interval are assigned to the LYING class.

The thresholds used for the accelerometers and the classifications obtained when these inequalities are observed are given by Table 1.

TABLE 1

| | | |
|---|---|---|
| th1 | +0.8 | Lying (on the stomach) |
| th1 | −0.8 | Lying (on the back) |
| th2 | +0.5 | Lying (on the side) |
| th3 | +0.3 | Lying |
| th4 | −0.7 | Standing or sitting |

A difficulty here is not to confuse a horizontal posture of the LYING type with the case when the person is strongly leaning forwards. A time criterion (duration of the forward leaning horizontal posture) is applied in this case for detecting these situations, and the posture of the LYING type is assumed if a threshold of 300 seconds is reached.

At the end of these first steps, the classification HORIZONTAL (LYING) and VERTICAL (STANDING/SITTING) is supposed to be achieved.

One is then interested in the SITTING/STANDING classifications (E9) and in the identification of transfers (E10) by developing a set of decision rules based both on criteria based on the accelerometer and on the magnetometer. Identification of the postures and then of the transfers is preferably sought.

After different tests, the following decision criteria were retained:

For the STANDING class, a) The 0-segment should have a time period above a given time (10 seconds for example).

b) The walking phases are identified by analyzing the signal 3a, filtered at high frequencies. If the 0-segment contains a non-negligible portion of walking phase, the whole of the segment, the interval, is classified as STANDING. Walking is detected by a large energy peak at about 1 Hz.

c) Also, if the activity level IA or IM is greater than a threshold (0.04), it is assigned to the STANDING class.

Both criteria a and b or a and c, have to be met.

For the SITTING class, a) It is assumed that the 0-segment should have a time period above a given time (30 seconds for example).

b) If the 0-segment corresponds to a backward tilted posture (by at least 20 degrees), the segment is assigned to the SITTING class.

c) Also, if the activity level IA or IM is less than a threshold (0.02), the segment is assigned to the class SITTING.

Criteria a and b, or a and c, must be observed.

For the 1-segments:

Certain 1-segments are de facto determined in an intra-postural movement (artifact) or inter-postural movement (transfer). This assignment is determined according to the nature of the previous postures and of the next postures, when they have been determined.

A 1-segment between two different postures is a transfer, a 1-segment between two similar postures is an artifact and is not classified.

The segments which are then classified are added by the system into a learning base which collects their classification results and second parameters which, set into relationship with the classification results, are used for the elaboration of second decision rules by the system (by adjusting the weights in the case of a neuronal network); these second decision rules generally remain implicit, or unknown to the operators, who do not program them, and they are different from the first rules since they do not resort to different parameters. Further, the first decision rules rather resort to acceleration measurements in the relevant example, whereas the second rules rather resort to magnetometric measurements. It should be mentioned that other sensors may also be used helpfully for the second decision rules, such as gyrometers for measuring the rotational velocities of the person, notably yaw velocity.

The second rules are applied for satisfying the events remaining in the UNKNOWN class (E12). The parameters on which the algorithm operates are conventionally calculated on the signals required by the sensor 16 and on the intermediate signals (tilt angle, yaw angle, activity index . . . ). The calculated parameters are for example, for each segment:

statistics on the signals, duration, frequency content (distribution of the energy peaks in the frequency domain), or even the segment itself (signature).

At the end of this phase, a certain number of events (0-segment or 1-segment) are not classified and remain in the UNKNOWN class.

An idea of the invention is to use the whole or a part of the events already well classified in order to build an automatic learning base to be passed to a supervised learning algorithm (E11).

The learning base is gradually completed by means of the results of the newly identified segments. The second decision rules (weights on the neuronal network) are advantageously updated.

The computer holding the learning base therefore analyzes each segment, either already identified or not, in a similar way according to the second group of parameters by using the learning base. For each of the unknown segments, it calculates similarity scores with elements of each of the classes, or differences calculated according to the usual mathematical standards in a space of multiple dimensions. The relevant parameters may be, as regards the statistics of the signals, average values, energies, variances; as regards the actual segment, similarities with prior segments are searched for on their whole; this search is essentially conducted for 1-segments which are capable of representing transient states by being based on frequent and almost exact repetition of the same gestures for passing from one posture to another. The signature of the segment is a component of the signal which reflects a developmental function of the posture. Another interesting criterion would be the recognition of a rest phase with large duration having a yaw angle (average azimuth considered on one segment) similar to a reference azimuth (corresponding to a seat of fixed orientation in the home of the wearer), therefore of a sitting class, while again making the most of repetitions of attitudes related to habits of the person here, independently of the actual signals; these examples also show that a classification parameter will often be the yaw angle or its time variation.

When a new segment has been added into the learning base, the following calculations may also be made with reference to it.

Certain possibilities of generalization are now given.

The rules of the first group may be selected from the following, in more complex embodiments of the method:
recognition of an activity phase corresponding to walking (positive and sufficiently regular acceleration in the AP axis), therefore of the standing class;
recognition of a rest phase and then, without any transition, of a walking phase (only the acceleration in the AP axis changes), therefore classification of the rest phase in the standing class;
recognition of a rest phase having a strongly negative pitch or elevation angle, (around the axis ML from the axis VT) corresponding to a sitting person leaning backwards, therefore of the sitting class;
recognition of a rest phase with significant duration having a slightly varying yaw angle (rotation around the axis VT), therefore of the sitting class;
recognition of an activity phase having a strongly varying yaw angle and a pitch or elevation angle of moderate variation, corresponding to a change in direction of the wearer, therefore of the standing class;
recognition of a strong activity phase of not very significant duration between two identical postures, therefore of the same class: one is in the presence of a movement interior to a same standing or sitting class;
recognition of a strong activity phase with not very significant duration between two different postures, therefore corresponding to a transition, and classified as standing/sitting or sitting/standing.

These pieces of information are either given by the accelerometers (for the movement), or by the magnetometers (for the orientations), or by a combination of both.

The parameters used for the second decision rules may be those which are used for applying the first classification rules (by combining them in another way) or, in a more typical and more fruitful way, other parameters. The second classification rules are determined and may be amended so that the evaluations made on the identified states tend to agree with the evaluations obtained with the first classification rules for the same phases.

If the first decision rules are associated with the production of a confidence index of the classification results that they provide, the events which will have been classified in the first step may be added to the learning base only if the confidence index has reached a value above a certain threshold: events classified as soon as the first step but with insufficient certainty will not have any influence on the second decision rules.

The method of the invention actually lends itself to supervised learning of the second decision rules. All the decision rules are then defined by the operator: the first decision rules may be those for which the application is the simplest, and the second decision rules those which require calculations, which interact with each other or which tolerate exceptions or which are not perfectly known and which may be amended subsequently.

In other cases, on the contrary it may be helpful to correct the first decision rules, when they give a result different from that of the second decision rules or when they are in contradiction therewith: the result given by the second decision rules will allow identification of the first decision rules which will have given an opposite result: these rules may be amended (when they depend on a threshold for example), reduced by granting them lesser importance, or even suppressed. The correction may be decided according to the number and the confidence index of the results or to the respective reliability of the rules.

The second decision rules may themselves be controlled by third decision rules specified by the operator and being used for detecting classification errors of the second decision rules. When errors are detected, the second decision rules may be corrected so as to tend to have their classification results coincide with the desired results. It is further possible to add the relevant events into the learning base with the values of their parameters and the result corrected by the third decision rules.

Another enhancement of the method would consist of suppressing the first decision rules or only some of them, either gradually or not, when it is estimated that the second decision rules have achieved sufficient reliability, notably when the learning base has reached a sufficient size or when the second decision rules are stabilized in a state where they classify all the events reliably.

For all these enhancements where the decision rules are likely to change, the use of confidence indexes provides assistance not only by designating doubtful results, but by disclosing the rules which give them and which are therefore less helpful or capable of being corrected.

The invention claimed is:

1. A method for identifying postures of a person, comprising:
attaching a movement sensor on the person, the sensor providing a signal depending on the postures of the person during a time period;
extracting a first signal from the sensor;
making a temporal partition of the first signal into temporal segments each corresponding to a particular one of the postures, said temporal partition;

making a first classification by classifying each temporal segment according to first decision rules, a part of the temporal segments being classified in a class of known posture and another part of the temporal segments, not being classified in a class of known postures, being classified in a class of undetermined posture;

extracting a second signal from the sensor;

creating an automatic learning base, which automatically elaborates second decision rules depending on the second signal and at least some of those temporal segments classified in a class of known postures in the first classification; and making a second classification by classifying the segments in the class of undetermined posture in a class of known posture of the first classification with said second decision rules, wherein the making the temporal partition includes using partitioning parameters with an activity index based on at least one of a kinetic energy of the person or a change in the pitch or yaw of the person.

2. The method for identifying postures of a person according to claim 1, further comprising sampling the signal into portions with uniform durations and grouping groups of portions to provide segments.

3. The method for identifying postures of a person according to claim 2, wherein the grouping of groups of portions is carried out according to a criterion of maximum variation of an activity level of the person and a criterion of maximum tilt variation of the person.

4. The method for identifying postures of a person according to claim 1, further comprising:
applying the second decision rules to said segments previously classified into the event classes using the first decision rules.

5. The method for identifying postures of a person according to claim 4, further comprising:
suppressing at least one rule of the first decision rules upon determination that the second decision rules have achieved sufficient reliability.

6. The method for identifying postures of a person according to claim 1, wherein:
the making the temporal partition includes using partitioning parameters with an activity index ($\overline{IA}$) based on average kinetic energy according to a first relation:

$$\overline{IA}[n] = \frac{1}{F_e} \sum_{k=0}^{F_e - 1} N_{acc} HF[nF_e + k],$$

n is an index, $F_e$ is a sampling frequency,

F is an accelerometer signal, $F_{AP}$, $F_{ML}$, and $F_{VT}$ are measured values of the components of the accelerometer signal in an antero-posterior axis direction, a medio-lateral axis direction, and a vertical axis direction, respectively, a is the acceleration, H designates band-pass filtering, and the value $N_{acc}$ is calculated according to a second relation:

$$N_{acc} HF[n] = \sqrt{aHF_{AP}[n]^2 + aHF_{ML}[n]^2 + aHF_{VT}[n]^2}.$$

7. The method for identifying postures of a person according to claim 1, wherein:
the making the temporal partition includes using partitioning parameters with an activity index ($\overline{IM}$) based on yaw activity of the wearer in a medio-lateral axis direction according to a first relation:

$$\overline{IM}[n] = \overline{h}_{ML}[n+1] - \overline{h}_{ML}[n],$$

n is an index, the value $\overline{h}_{ML}$ is calculated according to a second relation:

$$\overline{h}_{ML}[n] = \frac{1}{F_e} \sum_{k=0}^{F_e - 1} h_{ML}[nF_e + k],$$

$F_e$ is a sampling frequency, and $h_{ML}$ is a component of a magnetometer signal in the medio-lateral axis direction.

8. A method according to claim 1, wherein the movement sensor includes a first sensor and a second sensor, the first signal being provided by the first sensor and the second signal by the second sensor.

9. A method according to claim 8, wherein the first sensor is an acceleration sensor and the second sensor is a magnetometer.

10. A method according to claim 1, wherein the first decision rules provide a confidence index for each of the temporal segments classified in a class of known posture by the first decision rules, and said temporal segments classified by the first decision rules are exploited by the learning base only if their confidence index is above a predetermined threshold.

* * * * *